United States Patent
Guo et al.

(10) Patent No.: US 12,350,604 B2
(45) Date of Patent: Jul. 8, 2025

(54) ALL-WEATHER SOLAR SEAWATER DESALINATION DEVICE AND METHOD

(71) Applicant: Guangdong Ocean University, Zhanjiang (CN)

(72) Inventors: Jingyuan Guo, Zhanjiang (CN); Lefan Li, Zhanjiang (CN); Tuanzhang Li, Zhanjiang (CN); Chengpeng Li, Zhanjiang (CN); Zhang Hu, Zhanjiang (CN); Sidong Li, Zhanjiang (CN)

(73) Assignee: Guangdong Ocean University, Zhanjiang (CN)

( * ) Notice: Subject to any disclaimer, the term of this patent is extended or adjusted under 35 U.S.C. 154(b) by 0 days.

(21) Appl. No.: 18/797,824

(22) Filed: Aug. 8, 2024

(65) Prior Publication Data
US 2025/0144544 A1    May 8, 2025

Related U.S. Application Data

(63) Continuation of application No. PCT/CN2024/098059, filed on Jun. 7, 2024.

(51) Int. Cl.
*C02F 1/14*    (2023.01)
*B01D 1/00*    (2006.01)
(Continued)

(52) U.S. Cl.
CPC .......... *B01D 1/30* (2013.01); *B01D 1/0035* (2013.01); *B01D 5/006* (2013.01); *B01F 23/511* (2022.01);
(Continued)

(58) Field of Classification Search
CPC ....... B01D 1/0029; B01D 1/0035; C02F 1/14; C02F 1/04–20; C08F 20/56
See application file for complete search history.

(56) References Cited

U.S. PATENT DOCUMENTS

| | | | | |
|---|---|---|---|---|
| 3,919,140 A | * | 11/1975 | Hirata | C08F 20/56 526/236 |
| 11,834,351 B1 | * | 12/2023 | Li | B01D 1/0035 |
| 2018/0327279 A1 | * | 11/2018 | Yu | B01D 1/22 |

FOREIGN PATENT DOCUMENTS

| | | | | |
|---|---|---|---|---|
| CN | 110183572 A | * | 8/2019 | B01D 1/0035 |
| CN | 111348708 A | * | 6/2020 | C02F 1/043 |

(Continued)

OTHER PUBLICATIONS

Zhiqiang Sun, Meng Wang, Xiaojiang Mu, Jianhua Zhou, Xiaoling Ke, Qiang Wu, Meng Kang, Xiaoyang Wang, Lei Miao, "Sustainable β-cyclodextrin modified polyacrylamide hydrogel for highly efficient solar-driven water purification", Materials Today Energy, vol. 35, 2023, 101330,ISSN 2468-6069, https://doi.org/10.101.*

(Continued)

*Primary Examiner* — Jonathan Luke Pilcher
(74) *Attorney, Agent, or Firm* — Piloff Passino & Cosenza LLP; Rachel Piloff; Sean Passino

(57) ABSTRACT

The disclosure relates to the technical field of solar seawater desalination, in particular to an all-weather solar seawater desalination device and a method. Through a prepared composite hydrogel evaporator, the water in seawater is evaporated into steam and condensed into fresh water. By combining solar energy with a long afterglow luminous device, the composite hydrogel evaporator is irradiated by solar energy to evaporate during the day, while at night, the light energy released by the long afterglow luminous device continues to maintain the evaporation process.

3 Claims, 3 Drawing Sheets

(51) Int. Cl.
  *B01D 1/30*    (2006.01)
  *B01D 5/00*    (2006.01)
  *B01F 23/50*   (2022.01)
  *C09D 7/61*    (2018.01)
  *C09D 133/26*  (2006.01)
  *C09K 11/77*   (2006.01)
  *C02F 103/08*  (2006.01)
  *C08K 3/04*    (2006.01)

(52) U.S. Cl.
  CPC .............. *B01F 23/551* (2022.01); *C02F 1/14* (2013.01); *C09D 7/61* (2018.01); *C09D 133/26* (2013.01); *C09K 11/7792* (2013.01); *C02F 2103/08* (2013.01); *C02F 2201/002* (2013.01); *C08K 3/041* (2017.05); *C08K 2201/011* (2013.01)

(56) References Cited

FOREIGN PATENT DOCUMENTS

| CN | 113860413 | A | * | 12/2021 | |
| CN | 114891266 | A | * | 8/2022 | ................ C02F 1/14 |
| CN | 114891266 | B | * | 9/2022 | ................ C02F 1/14 |

OTHER PUBLICATIONS

Espacenet translation of CN 111348708 A.*
Espacenet translation of CN 110183572 A.*
Ali, M.A.M., Alsabagh, A.M., Sabaa, M.W. et al. Polyacrylamide hybrid nanocomposites hydrogels for efficient water treatment. Iran Polym J 29, 455-466 (2020). https://doi.org/10.1007/s13726-020-00810-y.*
PE2E translation of CN 113860413 A.*
PE2E translation of CN 114891266 A.*
PE2E translation of CN 114891266 B.*
D. Van der Heggen, J. J. Joos, A. Feng, V. Fritz, T. Delgado, N. Gartmann, B. Walfort, D. Rytz, H. Hagemann, D. Poelman, B. Viana, P. F. Smet, Persistent Luminescence in Strontium Aluminate: A Roadmap to a Brighter Future. Adv. Funct. Mater. 2022, 32, 2208809. https://doi.org/10.1002/adfm.202208809.*
Xiaowu Hu, Hua Yang, Tiantong Guo, Dehua Shu, Wenfei Shan, Guizhi Li, Dongcai Guo, "Preparation and properties of Eu and Dy co-doped strontium aluminate long afterglow nanomaterials", Ceramics International, vol. 44, Issue 7, 2018, pp. 7535-7544, ISSN 0272-8842, https://doi.org/10.1016/j.ceramint.2018.01.157.*
Retrieval report dated Jan. 10, 2024 in SIPO application No. 202311473406.7.
First Office action dated Dec. 15, 2023 in SIPO application No. 202311473406.7.
Notification to Grant Patent Right for Invention dated Jan. 15, 2024 n SIPO application No. 202311473406.7.

\* cited by examiner

ALL-WEATHER SOLAR SEAWATER DESALINATION DEVICE AND METHOD

CROSS-REFERENCE TO RELATED APPLICATIONS

This application is a continuation of PCT/CN2024/098059, filed Jun. 7, 2024 and claims priority of Chinese Patent Application No. 202311473406.7, filed on Nov. 8, 2023, the entire contents of which are incorporated herein by reference.

TECHNICAL FIELD

The disclosure relates to the technical field of solar seawater desalination, in particular to an all-weather solar seawater desalination device and a method.

BACKGROUND

With the aggravation of water shortage, solar desalination technology has become an important way to obtain fresh water resources. However, the existing solar seawater desalination technology has an important limitation, that is, the solar energy may only be used for evaporation during the day and may not be used for evaporation at night, thus limiting the efficiency and stability of seawater desalination. The traditional solar desalination technology usually relies on daylight to provide energy for evaporation, so the evaporation efficiency decreases significantly at night or cloudy days. Although there are some methods based on thermal energy storage that may continue to evaporate at night, these methods are usually complicated and costly. Therefore, an innovative method is urgently needed to overcome the limitations of the existing technology and realize all-weather and efficient solar seawater desalination.

SUMMARY

An objective of the disclosure is to provide an all-weather solar seawater desalination device and a method to solve the problems existing in the prior art.

In order to achieve the above objective, the disclosure provides an all-weather solar seawater desalination device, including a stand, where a placing tank is arranged at a top end of the stand, and a seawater holding tank and a fresh water holding tank are arranged in the placing tank, and the fresh water holding tank is arranged in a circumferential direction of the seawater holding tank, and a composite hydrogel evaporator is arranged in the seawater holding tank; a long afterglow support frame is fixedly installed at the top end of the stand, and a long afterglow luminous device is installed at one side of the long afterglow support frame close to the placing tank; a transparent cover is arranged above the placing tank, where the transparent cover is erected on the long afterglow support frame, and an inner bottom end of the transparent cover extends into the fresh water holding tank.

Optionally, the transparent cover is a transparent glass cover, and the transparent cover has a conical structure.

Optionally, the composite hydrogel evaporator includes a water supply layer and an evaporation layer layered in stages; the water supply layer is polyacrylamide hydrogel, and the evaporation layer is a polyacrylamide/carbon nanotube coating coated on a qualitative filter paper.

Optionally, a mass ratio of carbon nanotubes to polyacrylamide in the evaporation layer is 1-10:100.

Optionally, a diameter of the carbon nanotubes in the evaporation layer is 30 nanometers (nm) to 100 nm.

Optionally, a height ratio of the evaporation layer to the water supply layer is 1:5-12.5.

The disclosure also provides a preparation method of the all-weather solar seawater desalination device, including following steps:

preparation of polyacrylamide hydrogel:
mixing acrylamide, initiator ammonium persulfate, co-initiator tetramethylethylenediamine, crosslinking agent methylene bisacrylamide and water, and performing a polymerization crosslinking reaction in a mold to obtain the polyacrylamide hydrogel, where a mass ratio of the acrylamide, initiator ammonium persulfate, co-initiator tetramethylethylenediamine, crosslinking agent methylene bisacrylamide and water is 10-20:0.001-0.030:0.001-0.030:0.0005-0.0025:80-120;

preparation of polyacrylamide slurry:
mixing acrylamide, initiator ammonium persulfate, co-initiator tetramethylethylenediamine and water, and performing a polymerization reaction to obtain a polyacrylamide slurry, where a mass ratio of the acrylamide, initiator ammonium persulfate, co-initiator tetramethylethylenediamine and water is 1-3:0.01-0.015:0.01-0.015:78-160;

preparation of polyacrylamide/carbon nanotube coating:
mixing carbon nanotubes with the polyacrylamide slurry prepared with a mass ratio of carbon nanotubes to polyacrylamide of 1-10:100, and dispersing by ultrasound to prepare a polyacrylamide/carbon nanotube composite solution with a ratio of carbon nanotubes to polyacrylamide of 2%-4%, and coating the composite solution prepared on a qualitative filter paper to obtain the polyacrylamide/carbon nanotube coating;

preparation of composite hydrogel evaporator:
adhering the polyacrylamide/carbon nanotube coating prepared to a top end face of the polyacrylamide hydrogel prepared, and standing for 10 minutes (min)-20 min, after then obtaining the composite hydrogel evaporator;

preparation of long afterglow luminous device:
mixing a long afterglow material with the polyacrylamide slurry prepared to obtain a long afterglow slurry with a mass percentage concentration of the long afterglow material of 20%-30%, and coating the long afterglow slurry on the qualitative filter paper and naturally drying to prepare the long afterglow luminous device; and assembly:
assembling the stand, the seawater holding tank, the fresh water holding tank, the transparent cover, the long afterglow support frame, the composite hydrogel evaporator prepared and the long afterglow luminous device to obtain the all-weather solar seawater desalination device.

Optionally, the long afterglow material is strontium aluminate co-activated by europium and dysprosium.

Optionally, a temperature of the polymerization crosslinking reaction and the polymerization reaction is 20 degrees Celsius (° C.)–80° C., and a duration is 1 hour (h)-3 h.

Optionally, a duration of an ultrasonic dispersion is 5 min-45 min.

Compared with the prior art, the disclosure has following advantages and technical effects.

All-weather high-efficiency evaporation: this device realizes all-weather high-efficiency evaporation through the dual irradiation and evaporation of solar energy during the day and the long afterglow luminous device at night. Traditional devices are limited to evaporation using sunlight during the day, and the evaporation efficiency is greatly decreased at night. However, the disclosure overcomes this limitation through the innovative application of long afterglow luminous device, thus significantly improving the efficiency of seawater desalination.

Efficient energy utilization: by using two different energy sources, solar energy and long afterglow luminous device, this device realizes efficient energy utilization in different time periods. In the daytime, the sunlight is utilized, and the long afterglow luminous device stores energy, and at night, the light energy of the long afterglow luminous device is released, so that the energy is used to the maximum extent, thus improving the overall energy utilization efficiency.

BRIEF DESCRIPTION OF THE DRAWINGS

In order to explain the embodiments of the disclosure or the technical scheme in the prior art more clearly, the drawings needed in the embodiments will be briefly introduced below. Obviously, the drawings in the following description are only some embodiments of the disclosure, and other drawings may be obtained based on these drawings by ordinary people in the field without creative work.

DETAILED DESCRIPTION OF THE EMBODIMENTS

It should be noted that the embodiments in the disclosure and the features in the embodiments may be combined with each other without conflict. The described embodiments are only a part of the embodiments of the disclosure, not all the embodiments. All other embodiments obtained by ordinary people in the field without creative work belong to the protection scope of the disclosure. The disclosure will be described in detail with reference to the attached drawings and embodiments.

Figure 1:
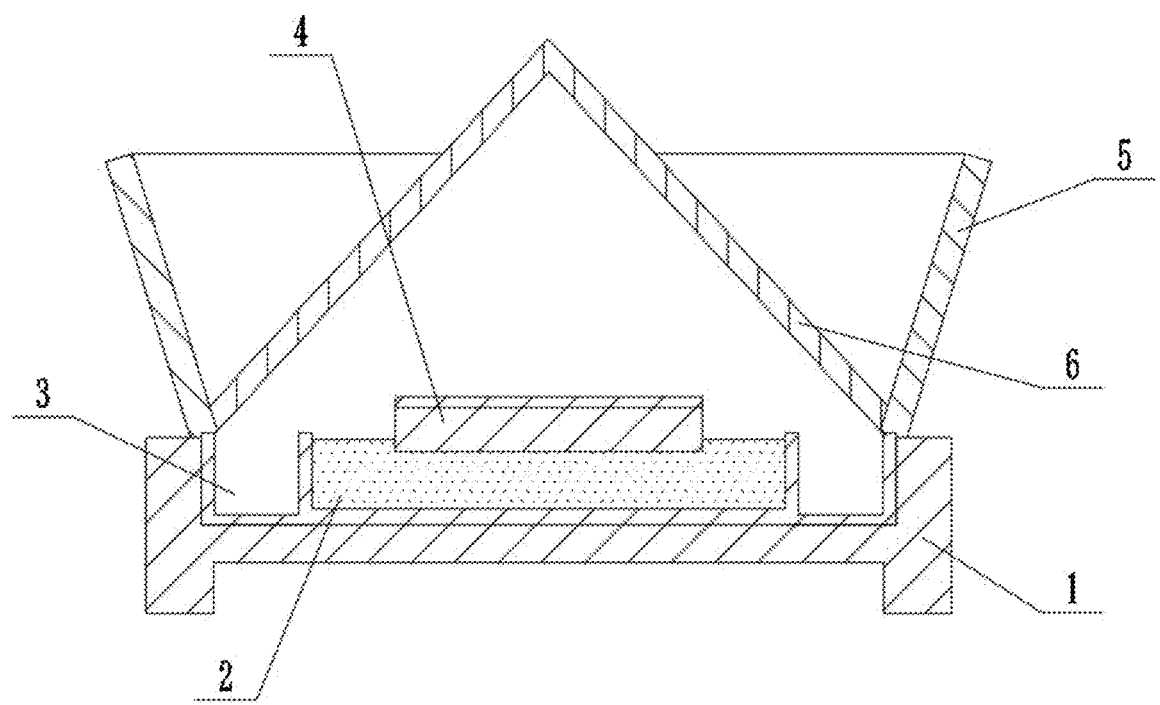
FIG. 1 is a schematic structural diagram of an all-weather solar seawater desalination device according to the disclosure.
Figure 2:
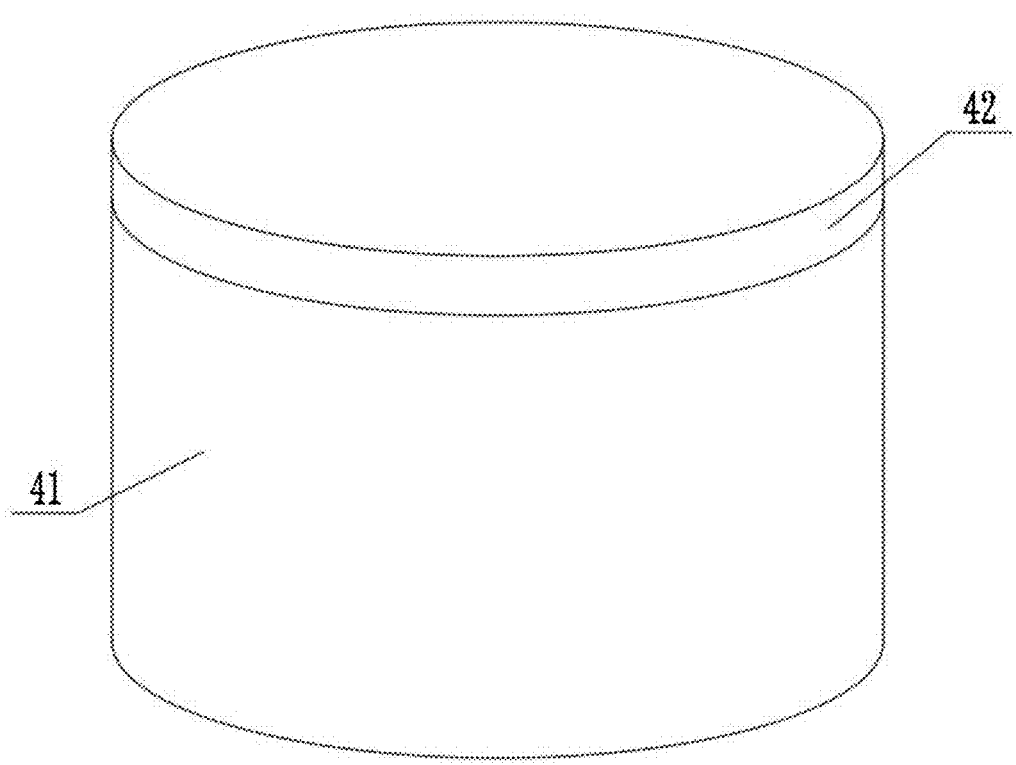
FIG. 2 is a schematic structural diagram of a composite hydrogel evaporator of according to disclosure.

The disclosure provides an all-weather solar seawater desalination device, as shown in FIG. 1 and FIG. 2, including a stand 1, where a placing tank is arranged at a top end of the stand 1, and a seawater holding tank 2 and a fresh water holding tank 3 are arranged in the placing tank, and the fresh water holding tank 3 is arranged in a circumferential direction of the seawater holding tank 2, and a composite hydrogel evaporator 4 is arranged in the seawater holding tank 2; a long afterglow support frame 5 is fixedly installed at the top end of the stand 1, and a long afterglow luminous device is installed at one side of the long afterglow support frame 5 close to the placing tank; a transparent cover 6 is arranged above the placing tank, where the transparent cover 6 is erected on the long afterglow support frame 5, and an inner bottom end of the transparent cover 6 extends into the fresh water holding tank 3.

In an embodiment, the transparent cover 6 is a transparent glass cover, and the transparent cover 6 has a conical structure.

In an embodiment, the composite hydrogel evaporator 4 includes a water supply layer 41 and an evaporation layer 42 layered in stages; the water supply layer 41 is polyacrylamide hydrogel, and the evaporation layer 42 is a polyacrylamide/carbon nanotube coating coated on a qualitative filter paper.

In an embodiment, a mass ratio of carbon nanotubes to polyacrylamide in the evaporation layer 42 is 1-10:100.

In an embodiment, a diameter of the carbon nanotubes in the evaporation layer 42 is 30 nm-100 nm.

In an embodiment, a height ratio of the evaporation layer 42 to the water supply layer 41 is 1:5-12.5.

Figure 3:
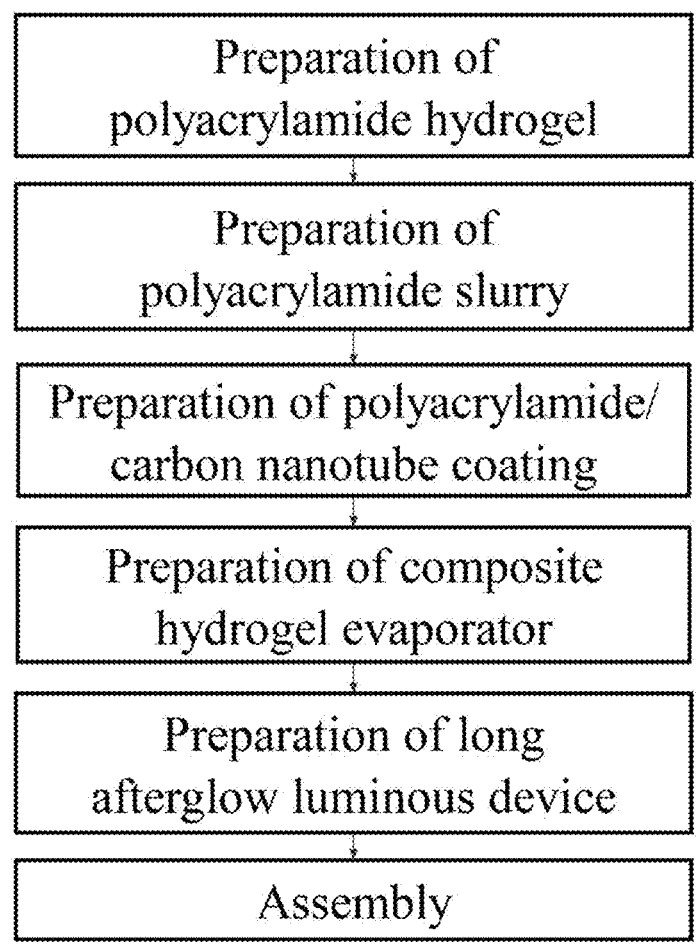
FIG. 3 is a flowchart of a preparation method of the all-weather solar seawater desalination device according to the disclosure.

The disclosure also provides a preparation method of the all-weather solar seawater desalination device, as shown in FIG. 3, including following steps:
preparation of polyacrylamide hydrogel:
mixing acrylamide, initiator ammonium persulfate, co-initiator tetramethylethylenediamine, crosslinking agent methylene bisacrylamide and water, and performing polymerization crosslinking reaction in a mold to obtain the polyacrylamide hydrogel, where a mass ratio of acrylamide, initiator ammonium persulfate, co-initiator tetramethylethylenediamine, crosslinking agent methylene bisacrylamide and water is 10-20: 0.001-0.030:0.001-0.030:0.0005-0.0025:80-120;
preparation of polyacrylamide slurry:
mixing acrylamide, initiator ammonium persulfate, co-initiator tetramethylethylenediamine and water, and performing a polymerization reaction to obtain the polyacrylamide slurry, where a mass ratio of the acrylamide, initiator ammonium persulfate, co-initiator tetramethylethylenediamine and water is 1-3:0.01-0.015:0.01-0.015:78-160;
preparation of polyacrylamide/carbon nanotube coating:
mixing carbon nanotubes with the prepared polyacrylamide slurry with a mass ratio of carbon nanotubes to polyacrylamide of 1-10:100, and dispersing by ultrasound to prepare a polyacrylamide/carbon nanotube composite solution with a ratio of carbon nanotubes to polyacrylamide of 2%-4%, and coating the prepared composite solution on a qualitative filter paper to obtain the polyacrylamide/carbon nanotube coating;
preparation of composite hydrogel evaporator 4:
adhering the prepared polyacrylamide/carbon nanotube coating to a top end face of the prepared polyacrylamide hydrogel, and after standing for 10 min to 20 min, obtaining a composite hydrogel evaporator 4;
preparation of long afterglow luminous device:
mixing a long afterglow material with the polyacrylamide slurry prepared to obtain long afterglow slurry with a mass percentage concentration of the long afterglow material of 20%-30%, and coating the long afterglow slurry on the qualitative filter paper and naturally drying to prepare a long afterglow luminous device; and
assembly:
assembling the stand 1, the seawater holding tank 2, the fresh water holding tank 3, the transparent cover 6, the long afterglow support frame 5, the composite hydrogel evaporator 4 prepared and the long afterglow luminous device to obtain an all-weather solar seawater desalination device.

In an embodiment, the long afterglow material is strontium aluminate co-activated by europium and dysprosium.

In an embodiment, a temperature of the polymerization crosslinking reaction and polymerization reaction is 20° C.-80° C., and a duration is 1 h-3 h.

In an embodiment, a duration of an ultrasonic dispersion is 5 min-45 min.

Embodiment 1

1. Preparation of polyacrylamide hydrogel: 30 grams (g) distilled water and 5 g acrylamide are added into a 100 millilitre (mL) beaker and stirred until the mixture is completely dissolved; 0.00025 g N,N'-methylene bisacrylamide, 0.0025 g ammonium persulfate and 0.0025 g N,N,N',N'-tetramethylethylenediamine are added, and a proper amount of distilled water is added to make the total weight reach 50 g, and the mixture is evenly stirred; the mixture is poured into a Petri dish with a diameter of 80 nanometers (nm), and polymerized and crosslinked at 25° C. for 2 h to obtain the polyacrylamide hydrogel.

2. Preparation of polyacrylamide slurry: in 38 g distilled water, 2 g acrylamide, 0.01 g ammonium persulfate and 0.01 g N,N,N',N'-tetramethylethylenediamine are added, stirred evenly, and after the mixture is left at room temperature for 30 min, the solution polymerization reaction becomes sticky; then 40 g water is added, stirred evenly, and the mixture is left at 25° C. for 30 min to obtain the polyacrylamide slurry.

3. Polyacrylamide/carbon nanotube coating and composite hydrogel evaporator 4:1 g of carbon nanotubes are dispersed in 49 g of polyacrylamide slurry, a polyacrylamide/carbon nanotube composite solution is prepared according to a ratio of carbon nanotubes to polyacrylamide of 2%, and the mixture is uniformly dispersed by ultrasonic for 30 min; 0.3 g of mixed solution is dropped on a qualitative filter paper to prepare a polyacrylamide/carbon nanotube coating, and the coating is adhered to the surface of polyacrylamide hydrogel prepared in the first step, and a composite hydrogel evaporator 4 is obtained after 10 min of standing, with a diameter of 80 millimeters (mm), a height of 4 mm and a coating height of 0.5 mm.

4. Preparation of long afterglow slurry: 10 g of long afterglow material is mixed with 40 g of polyacrylamide slurry to prepare a long afterglow slurry of 20% concentration.

5. Preparation of long afterglow luminous device: 5 g of long afterglow slurry is dropped on a qualitative filter paper and dried naturally to prepare a long afterglow luminous device.

6. The stand 1, the seawater holding tank 2, the fresh water holding tank 3, the transparent cover 6, the long afterglow support frame 5, the prepared composite hydrogel evaporator 4 and the long afterglow luminous device are assembled to obtain an all-weather solar seawater desalination device.

Embodiment 2

1. Preparation of polyacrylamide hydrogel: 30 g distilled water and 4.8 g acrylamide are added into a 100 ml beaker and stirred until the mixture is completely dissolved; 0.00025 g N,N'-methylene bisacrylamide, 0.0025 g ammonium persulfate and 0.0025 g N,N,N',N'-tetramethylethylenediamine are added, and a proper amount of distilled water is added to make the total weight reach 50 g, and the mixture is evenly stirred; the mixture is poured into a Petri dish with a diameter of 80 mm, and polymerized and crosslinked at 25° C. for 2 h to obtain polyacrylamide hydrogel.

2. Preparation of polyacrylamide slurry: in 38 g distilled water, 1.9 g acrylamide, 0.01 g ammonium persulfate and 0.01 g N,N,N',N'-tetramethylethylenediamine are added, stirred evenly, and after the mixture is left at room temperature for 30 min, the solution polymerization reaction becomes sticky; then 40 g water is added, stirred evenly, and the mixture is left at 25° C. for 30 min to obtain polyacrylamide slurry.

3. Polyacrylamide/carbon nanotube coating and composite hydrogel evaporator 4:1.1 g of carbon nanotubes are dispersed in 49 g of polyacrylamide slurry, a polyacrylamide/carbon nanotube composite solution is prepared according to a ratio of carbon nanotubes to polyacrylamide of 2.2%, and the mixture is uniformly dispersed by ultrasonic for 30 min; 0.3 g of mixed solution is dropped on a qualitative filter paper to prepare a polyacrylamide/carbon nanotube coating, and the coating is adhered to the surface of polyacrylamide hydrogel prepared in the first step, and a composite hydrogel evaporator 4 is obtained after 10 min of standing, with a diameter of 80 mm, a height of 4 mm and a coating height of 0.5 mm.

4. Preparation of long afterglow slurry: 10.1 g of long afterglow material is mixed with 40 g of polyacrylamide slurry to prepare long afterglow slurry of 20% concentration.

5. Preparation of long afterglow luminous device: 5.1 g of long afterglow slurry is dropped on a qualitative filter paper and dried naturally to make a long afterglow luminous device.

6. The stand 1, the seawater holding tank 2, the fresh water holding tank 3, the transparent cover 6, the long afterglow support frame 5, the prepared composite hydrogel evaporator 4 and the long afterglow luminous device are assembled to obtain an all-weather solar seawater desalination device.

Embodiment 3

1. Preparation of polyacrylamide hydrogel: 30 g distilled water and 5.2 g acrylamide are added into a 100 ml beaker and stirred until the mixture is completely dissolved; 0.00025 g N,N'-methylene bisacrylamide, 0.0025 g ammonium persulfate and 0.0025 g N,N,N',N'-tetramethylethylenediamine are added, and a proper amount of distilled water is added to make the total weight reach 50 g, and the mixture is evenly stirred; the mixture is poured into a Petri dish with a diameter of 80 mm, and polymerized and crosslinked at 25° C. for 2 h to obtain polyacrylamide hydrogel.

2. Preparation of polyacrylamide slurry: in 38 g distilled water, 2.1 g acrylamide, 0.01 g ammonium persulfate and 0.01 g N,N,N',N'-tetramethylethylenediamine are added, stirred evenly, and after the mixture is left at room temperature for 30 min, the solution polymerization reaction becomes sticky; then 40 g water is added, stirred evenly, and the mixture is left at 25° C. for 30 min to obtain polyacrylamide slurry.

3. Polyacrylamide/carbon nanotube coating and composite hydrogel evaporator 4:1.2 g of carbon nanotubes are dispersed in 49 g of polyacrylamide slurry, a polyacrylamide/carbon nanotube composite solution is prepared according to a ratio of carbon nanotubes to polyacrylamide of 2.4%, and the mixture is uniformly dispersed by ultrasonic for 30 min; 0.3 g of mixed solution is dropped on a qualitative filter paper to prepare a polyacrylamide/carbon nanotube coating, and the coating is adhered to the surface of polyacrylamide hydrogel prepared in the first step, and a composite hydrogel evaporator 4 is obtained after 10 min of standing, with a diameter of 80 mm, a height of 4 mm and a coating height of 0.5 mm.

4. Preparation of long afterglow slurry: 10.2 g of long afterglow material is mixed with 40 g of polyacrylamide slurry to prepare long afterglow slurry of 20% concentration.

5. Preparation of long afterglow luminous device: 5.2 g of long afterglow slurry is dropped on a qualitative filter paper and dried naturally to make a long afterglow luminous device.

6. The stand 1, the seawater holding tank 2, the fresh water holding tank 3, the transparent cover 6, the long afterglow support frame 5, the prepared composite hydrogel evaporator 4 and the long afterglow luminous device are assembled to obtain an all-weather solar seawater desalination device.

The working principle of the all-weather solar seawater desalination device provided by the disclosure is as follows.

The composite hydrogel evaporator 4 floats on the sea water and is irradiated by sunlight during the day. Due to the high-efficiency photo-thermal conversion effect of the composite hydrogel evaporator 4, the seawater is evaporated, and the generated water vapor rises, which becomes condensed water after encountering the transparent glass cover, and the condensed water flows down along the transparent glass cover, so that fresh water may be collected. The long afterglow luminous device on the inner wall of the long afterglow support frame 5 is irradiated by sunlight during the day, and the electrons of the long afterglow material are in the excited state of high energy level, and the excited electrons return to the ground state at night, and the generated light is absorbed by the composite hydrogel evaporator 4, and the composite hydrogel evaporator 4 performs seawater desalination as in the day. Therefore, the continuous and efficient seawater desalination process is realized 24 hours a day, the problem that the traditional seawater desalination device may not evaporate efficiently at night is solved, and the efficiency and stability of seawater desalination are greatly improved.

According to the all-weather solar seawater desalination devices obtained in Embodiment 1 to Embodiment 3, the daytime evaporation rate and the total evaporation at night are measured respectively, and the results are as follows.

TABLE 1

Daytime evaporation rate and night evaporation of seawater desalination device

| Evaporation rate and evaporation | Light source | Embodiment 1 | Embodiment 2 | Embodiment 3 | Average |
|---|---|---|---|---|---|
| Daytime evaporation rate kilogram/square meter/hour (kg · m$^{-2}$ · h$^{-1}$) | Sun | 1.980 | 1.986 | 1.990 | 1.985 |
| Total evaporation at night kilogram/square meter (kg · m$^{-2}$) | Long afterglow | 3.972 | 3.978 | 3.985 | 3.978 |

In the Table 1, the daytime evaporation rate is measured when the sun shone during the day, and the long afterglow is also irradiated by the sun during the day. Due to the excitation of the sun, the device continues to emit light after dark, and the total evaporation at night is obtained by continuous measurement for 10 h. As may be seen from Table 1, the total evaporation at night for 10 hours is about 2 hours during the day. Therefore, it is proved that the all-weather solar seawater desalination device may significantly improve the seawater desalination efficiency.

The concentrations of sodium ions, magnesium ions, potassium ions and calcium ions in seawater before desalination and in fresh water obtained after desalination are tested, and the test results are shown in Table 2.

TABLE 2

Concentration ppm of metal ions in seawater before and after desalination in Embodiment 1-Embodiment 3

| Embodiments | Sodium ions | Magnesium ions | Potassium ions | Calcium ions |
|---|---|---|---|---|
| Untreated seawater | 11600 | 6540 | 436 | 367 |
| Embodiment 1 | 8.55 | 5.38 | 1.83 | 1.78 |
| Embodiment 2 | 8.37 | 5.60 | 1.81 | 1.84 |
| Embodiment 3 | 8.42 | 5.38 | 1.95 | 1.78 |

As may be seen from Table 2, the salt removal rate in the water after desalination by the all-weather solar seawater desalination device provided by the disclosure reaches 99.9%.

The above are only preferred embodiments of this application, but the protection scope of this application is not limited to this. Any change or replacement that may be easily thought of by a person familiar with this technical field within the technical scope disclosed in this application should be covered by this application. Therefore, the protection scope of this application should be based on the protection scope of the claims.

What is claimed is:

1. A preparation method of an all-weather solar seawater desalination device, the method comprising:
preparing a polyacrylamide hydrogel by mixing acrylamide, initiator ammonium persulfate, co-initiator tetramethylethylenediamine, crosslinking agent methylene bisacrylamide and water, and performing polymerization crosslinking reaction in a mold to obtain the polyacrylamide hydrogel;
preparing a polyacrylamide slurry by mixing acrylamide, initiator ammonium persulfate, co-initiator tetramethylethylenediamine and water, and performing polymerization reaction to obtain the polyacrylamide slurry;
preparing a polyacrylamide/carbon nanotube coating by mixing carbon nanotubes with a first portion of the polyacrylamide slurry, and dispersing by ultrasound to prepare a polyacrylamide/carbon nanotube composite solution, and coating the composite solution prepared on a qualitative filter paper to obtain the polyacrylamide/carbon nanotube coating;
preparing a composite hydrogel evaporator by adhering the polyacrylamide/carbon nanotube coating to a top end face of the polyacrylamide hydrogel, and obtaining the composite hydrogel evaporator after standing for 10-20 minutes;
preparing a long afterglow luminous device by mixing a long afterglow material comprising strontium aluminate co-activated by europium and dysprosium with a second portion of the polyacrylamide slurry to obtain a long afterglow slurry, and coating the long afterglow slurry on a qualitative filter paper and naturally drying to prepare the long afterglow luminous device; and
assembling a stand, a seawater holding tank, a fresh water holding tank, a transparent cover, a long afterglow support frame, the composite hydrogel evaporator prepared and the long afterglow luminous device to obtain the all-weather solar seawater desalination device.

2. The preparation method of the all-weather solar seawater desalination device according to claim 1, wherein a temperature of the polymerization crosslinking reaction and the polymerization reaction is 20° C.-80° C. for a duration is of 1 h-3 h.

3. The preparation method of the all-weather solar seawater desalination device according to claim 1, wherein a duration of the dispersing by ultrasound step in the preparation of the polyacrylamide/carbon nanotube coating is 5 min-45 min.

* * * * *